US008392499B2

(12) United States Patent

Cherkasova et al.

(10) Patent No.: US 8,392,499 B2
(45) Date of Patent: Mar. 5, 2013

(54) SYSTEM AND METHOD FOR RELATING ABORTED CLIENT ACCESSES OF DATA TO QUALITY OF SERVICE PROVIDED BY A SERVER IN A CLIENT-SERVER NETWORK

(75) Inventors: Ludmila Cherkasova, Sunnyvale, CA (US); Yun Fu, Durham, NC (US); Wenting Tang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2466 days.

(21) Appl. No.: 10/146,988

(22) Filed: May 16, 2002

(65) Prior Publication Data

US 2005/0076111 A1 Apr. 7, 2005

(51) Int. Cl.
*G06F 15/16* (2006.01)

(52) U.S. Cl. ......... 709/203; 709/218; 709/225; 709/229

(58) Field of Classification Search .................. 709/203, 709/218, 225, 229, 224, 237
See application file for complete search history.

(56) References Cited

U.S. PATENT DOCUMENTS 5,819,301 A 10/1998 Rowe et al.
6,272,598 B1 8/2001 Arlitt et al.
6,330,602 B1 * 12/2001 Law et al. ..................... 709/224
6,338,059 B1 1/2002 Fields et al.
6,377,944 B1 4/2002 Busey et al.
6,389,462 B1 5/2002 Cohen et al.
6,484,143 B1 11/2002 Swildens et al.
6,535,913 B2 3/2003 Mittal et al.
6,549,941 B1 4/2003 Jaquith et al.
6,560,639 B1 5/2003 Dan et al.
6,594,260 B1 7/2003 Aviani et al.
6,636,972 B1 10/2003 Ptacek et al.
6,675,218 B1 1/2004 Mahler et al.
6,728,885 B1 4/2004 Taylor et al.
6,763,342 B1 7/2004 Mattern et al.
6,807,156 B1 * 10/2004 Veres et al. .................. 370/252
6,871,284 B2 3/2005 Cooper et al.
6,901,051 B1 * 5/2005 Hou et al. ..................... 370/231
6,901,553 B1 5/2005 Hayashi et al.
6,934,740 B1 8/2005 Lawande et al.
6,934,761 B1 8/2005 Curtis
6,938,202 B1 8/2005 Matsubayashi et al.
7,246,101 B2 7/2007 Fu
7,437,451 B2 10/2008 Tang
7,487,508 B2 2/2009 Fu
2001/0027483 A1 10/2001 Gupta et al.
2002/0032854 A1 3/2002 Chen et al.
2002/0046284 A1 4/2002 Brabson et al.
2002/0120727 A1 * 8/2002 Curley et al. ................. 709/223
2003/0005122 A1 1/2003 Freimuth et al.
2003/0028662 A1 2/2003 Rowley et al.
2003/0028674 A1 2/2003 Boden (Continued)

OTHER PUBLICATIONS

"Candle Corporation eBusiness"; printed from Website http://www.candle.com—10 pages.

(Continued)

*Primary Examiner* — Thuong Nguyen

(57) ABSTRACT

A system and method are provided for relating aborted client accesses of server information to the quality of service provided to clients by a server in a client-server network. According to one embodiment, a method comprises determining performance data for at least one aborted client access of information from a server in a client-server network, and using the performance data to determine whether the aborted client access(es) relate to the quality of service provided to a client by the server.

40 Claims, 6 Drawing Sheets

U.S. PATENT DOCUMENTS

| | | | |
|---|---|---|---|
| 2003/0110394 A1 | 6/2003 | Sharp et al. | |
| 2003/0217117 A1 | 11/2003 | Dan et al. | |
| 2003/0221000 A1 | 11/2003 | Cherkasova | |
| 2008/0183664 A1 * | 7/2008 | Cancel et al. | 707/2 |

OTHER PUBLICATIONS

"Cisco DistributedDirector"; printed from Website http//www.cisco.com—20 pages.
Feldmann, Anja, "BLT: Bi-Layer Tracing of HTTP and TCP/IP", AT&T Labs—Research, Florham Park, NJ,—12 pages.
"IBM Corporation, Tivoli Web Management Solutions"; printed from Website http://www.tivoli.com—5 pages.
"JavaServlet Technology"; printed from Website http://java.sun.com—14 pages.
"Javaserver Pages White Paper"; printed from Website http://java.sun.com—8 pages.
"Keynote Systems, Inc."; printed from Website http://www.keynote.com—4 pages.
Krishnamurthy, Balachander, et al.; "Web Protocols and Practice: HTTP/1.1, Networking Protocols, Caching, and Traffic Measurement", pp. 511-522, Addison Wesley, 2001.
NetMechanic, Inc.; printed from Website http://www.netemechanics.com—2 pages.
Porivo Technologies, Inc.; printed from Website http://www.porivo.com—5 pages.
Rajamony, Ramakrishnan et al., Measuring Client-Perceived Response Times on the WWW; proceedings of the Third USENIX Symposium on Internet Technologies and Systems, Mar. 2001—12 pages.
Seshan, Srinivasan, et al., "SPAND: Shared Passive Network Performance Discovery", USENIX Symposium on Internet Technologies and Systems, 1997, 6 pages.
Stemm, Mark, et al., "A Network Measurement Architecture for Adaptice Applications", USENIX Symposium on Internet Technologies and Systems, 1997—10 pages.
Software Research, Inc.; printed from Website http://www.soft.com—2 pages.
TCPDUMP, printed from Website http://www.tcpdump.org—3 pages.
Smith, F. Donelson, et al., "What TCP/IP Protocol Headers Can Tell Us About the Web", Proceedings of ACM Sigmetrics 2001//Performance 2001, Jun. 2001—12 pages.
RFC2616; printed from Internet RFC/STD/FYI/BCO Archives.
Ramakrishnan Rajamony et al.; "Measuring Client-Perceived Response Times on the WWW"; proceedings of the Third USENIX Symposium on Internet Technologies and Systems; Mar. 2001; 12 pages.
Srinivasan Seshan et al., "SPAND: Shared Passive Network Performance Discovery"; USENIX Symposium on Internet Technology and Systems; 1997; 13 pages.
Mark Stemm et al., "A Network Measurement Architecture for Adaptive Applications", INFOCOM 2000. Nineteenth Annual Joint Conference of the IEEE Computer and Communications Societies. Proceedings. IEEE; Mar. 2000; 10 pages.
F. Donelson Smith et al., "What TCP/IP Protocol Headers Can Tell Us About the Web", Proceedings of ACM Sigmetrics 2001/Performance 2001; Jun. 2001; 12 pages.

* cited by examiner

SYSTEM AND METHOD FOR RELATING ABORTED CLIENT ACCESSES OF DATA TO QUALITY OF SERVICE PROVIDED BY A SERVER IN A CLIENT-SERVER NETWORK

CROSS-REFERENCE TO RELATED APPLICATIONS

This application is related to U.S. patent application Ser. No. 10/147,619 filed May 16, 2002, now U.S. Pat. No. 7,246,101 entitled "KNOWLEDGE-BASED SYSTEM AND METHOD FOR RECONSTRUCTING CLIENT WEB PAGE ACCESSES FROM CAPTURED NETWORK PACKETS", U.S. patent application Ser. No. 10/147,256 filed May 16, 2002, now U.S. Pat. No. 7,487,508 entitled "SYSTEM AND METHOD FOR RECONSTRUCTING CLIENT WEB PAGE ACCESSES FROM CAPTURED NETWORK PACKETS", U.S. patent application Ser. No. 10/147,249 filed May 16, 2002, now U.S. Pat. No. 7,437,451 entitled "SYSTEM AND METHOD FOR COLLECTING DESIRED INFORMATION FOR NETWORK TRANSACTIONS AT THE KERNEL LEVEL", and U.S. patent application Ser. No. 10/146,967 filed May 16, 2002, now U.S. Publication No. 2003/0221000 entitled "SYSTEM AND METHOD FOR MEASURING WEB SERVICE PERFORMANCE USING CAPTURED NETWORK PACKETS", the disclosures of which are hereby incorporated herein by reference.

FIELD OF THE INVENTION

The present invention relates in general to client-server networks, and more specifically to a system and method for relating aborted client accesses of data to the client-perceived quality of service provided by a server.

BACKGROUND OF THE INVENTION

Today, Internet services are delivering a large array of business, government, and personal services. Similarly, mission critical operations, related to scientific instrumentation, military operations, and health services, are making increasing use of the Internet for delivering information and distributed coordination. For example, many users are accessing the Internet seeking such services as personal shopping, airline reservations, rental car reservations, hotel reservations, on-line auctions, on-line banking, stock market trading, as well as many other services being offered via the Internet. Many companies are providing such services via the Internet, and are therefore beginning to compete in this forum. Accordingly, it is important for such service providers (sometimes referred to as "content providers") to provide high-quality services.

One potential indicator of the quality of service provided by service providers is the number of aborted client accesses of a service. It has been recognized that aborted client accesses of a service may be indicative of the client-perceived quality of such service. For instance, if a client requests to access a service provided by a service provider and it takes several minutes for the service to be downloaded from the service provider to the client, the client may consider the quality of the service as being poor because of its long download time. In fact, the client may be too impatient to wait for the service to fully load and may therefore abort the client's access thereof. For example, the client may cause his/her network connection to the service provider to be aborted (and may attempt to obtain the service from another provider).

The Internet is a popular client-server network in which a service provider may desire information about its client-perceived quality of service (QoS). The Internet is a packet-switched network, which means that when information is sent across the Internet from one computer to another, the data is broken into small packets. A series of switches called routers send each packet across the network individually. After all of the packets arrive at the receiving computer, they are recombined into their original, unified form. TCP/IP is a protocol commonly used for communicating the packets of data. In TCP/IP, two protocols do the work of breaking the data into packets, routing the packets across the Internet, and then recombining them on the other end: 1) the Internet Protocol (IP), which routes the data, and 2) the Transmission Control Protocol (TCP), which breaks the data into packets and recombines them on the computer that receives the information. TCP/IP is well known in the existing art, and therefore is not described in further detail herein.

One popular part of the Internet is the World Wide Web (which may be referred to herein simply as the "web"). Computers (or "servers") that provide information on the web are typically called "websites." Services offered by service providers' websites are obtained by clients via the web by downloading web pages from such websites to a browser executing on the client. For example, a user may use a computer (e.g., personal computer, laptop computer, workstation, personal digital assistant, cellular telephone, or other processor-based device capable of accessing the Internet) to access the Internet (e.g., via a conventional modem, cable modem, Digital Subscriber Line (DSL) connection, or the like). A browser, such as NETSCAPE NAVIGATOR® developed by NETSCAPE, INC. or MICROSOFT INTERNET EXPLORER® developed by MICROSOFT CORPORATION, as examples, may be executing on the user's computer to enable a user to input information requesting to access a particular website and to output information (e.g., web pages) received from an accessed website.

In general, a web page is typically composed of a mark-up language file, such as a HyperText Mark-up Language (HTML), Extensible Mark-up Language (XML), Handheld Device Mark-up Language (HDML), or Wireless Mark-up Language (WML) file, and several embedded objects, such as images. A browser retrieves a web page by issuing a series of HyperText Transfer Protocol (HTTP) requests for all objects. As is well known, HTTP is the underlying protocol used by the World Wide Web. The HTTP requests can be sent through one persistent TCP connection or multiple concurrent connections. Thus, web page is generally a complex object having multiple embedded objects (e.g., images and/or JAVASCRIPTs, etc.) each of which the client's browser retrieves separately.

As described above, service providers often desire to have an understanding of their client-perceived QoS. Effectively monitoring and characterizing the service provider's QoS is important for evaluating and/or improving the web site performance and selecting the proper web site architecture for a service provider to implement. One way to measure the QoS of a web server is to measure the amount of aborted client accesses of web pages provided by the web server. For example, the number of aborted client accesses with a web server may provide an indication of the web server's QoS. The logic behind this is that if a web site is not fast enough a user will get impatient and hit the stop button of his/her browser, thus aborting the client's access thereof.

Thus, detection of aborted client accesses of a web page may provide some indication regarding the client-perceived QoS of a website. However, interpreting all aborted client accesses of a web page as being indicative of poor server QoS is problematic. User actions at the browser level can effectively interrupt the request/response exchange for fetching page objects at any time. These interrupting actions include, as examples, clicking the browser "stop" or "reload" buttons while a page is loading. As an example of a further interrupting action, a user may "quick click" on a hyperlink displayed before the page loads completely.

It should be recognized that not all aborted client accesses of a web page are indicative of poor QoS. For instance, a user may interrupt a page load for reasons other than the client perceiving the QoS as poor for the page. For example, the user may be familiar with the page that is loading and may quick click on a hyperlink (i.e., before the page fully loads) to efficiently navigate through the page, or the user may simply change his/her mind about retrieving the page for reasons other than poor QoS. Thus, only a subset of aborted client accesses of a web page may be relevant to a poor website QoS or poor network performance, while the other portion of aborted accesses may be relevant to client-specific browsing patterns.

BRIEF SUMMARY OF THE INVENTION

According to one embodiment of the present invention, a method is provided for relating aborted client accesses of server information to the quality of service provided to clients by a server in a client-server network. The method comprises determining performance data for at least one aborted client access of information from a server in a client-server network, and using the performance data to determine whether the aborted client access(es) relate to the quality of service provided to a client by the server.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
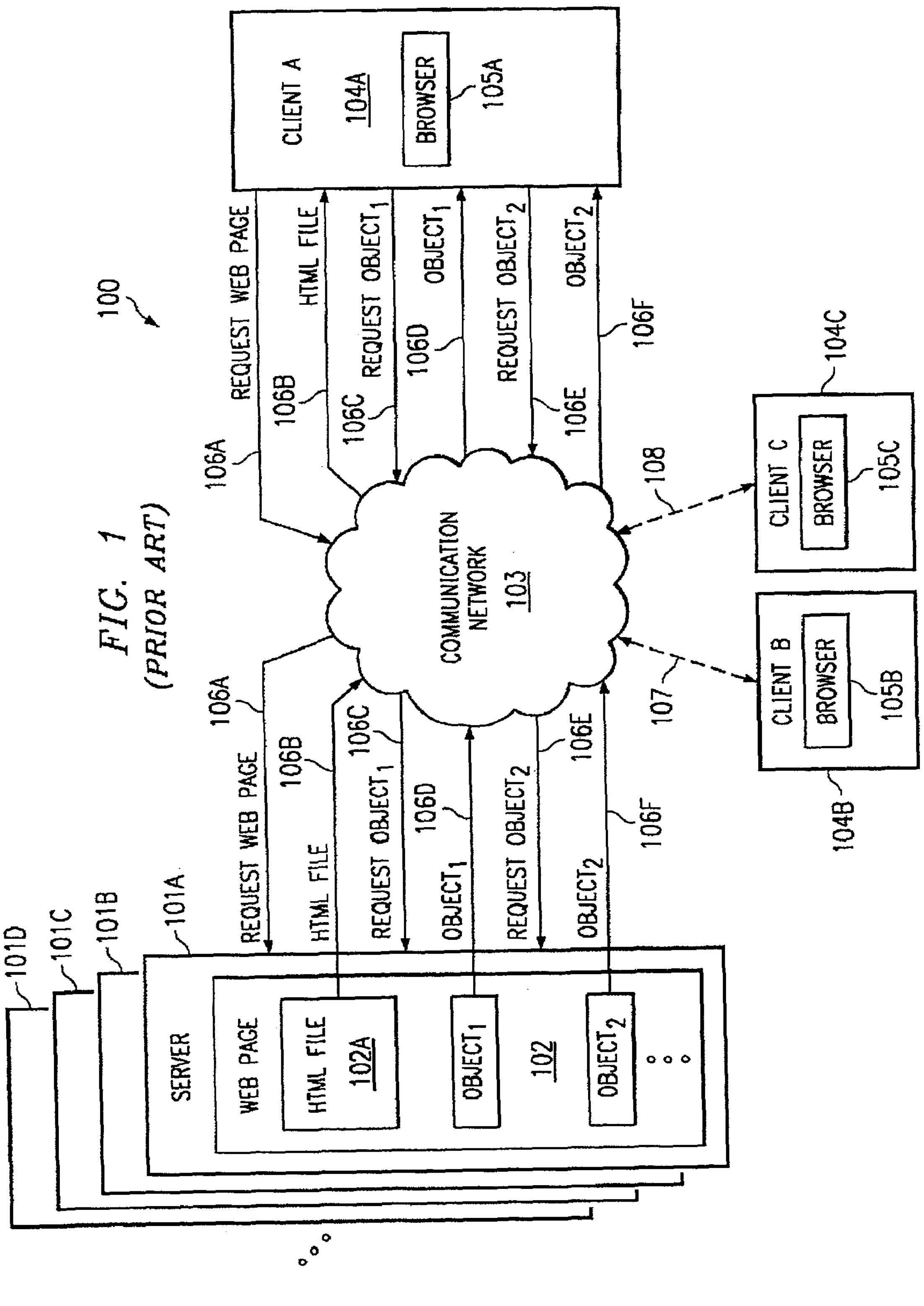
FIG. 1 (PRIOR ART)
FIG. 1 shows an example client-server system in which embodiments of the present invention may be implemented.

As described above, service providers in a client-server network (e.g., website providers) often desire to have an understanding of their client-perceived quality of service (QoS). An indication of the client-perceived QoS may be obtained by evaluating the number of aborted client accesses of data (or "information") on a server. For example, if a website does not download a requested web page fast enough to a client, the user may get impatient and hit the stop button of his/her browser, thus aborting the client's access of such web page. Generally, an aborted access comprises an aborted connection(s) (e.g., aborted network connection(s)) with the server. For instance, a client aborted access of a web page may comprise aborting the client's network connection(s) (e.g., TCP connection(s)) with the web server.

However, as discussed above, interpreting all aborted client accesses of data (e.g., web page) on a server as being indicative of poor server QoS is problematic because not all aborted client accesses are truly indicative of a server's QoS. For instance, a user may interrupt a web page load for reasons other than the client perceiving the page's QoS as poor. For example, the user may be familiar with the page loading and may quick click on a hyperlink (i.e., before the page fully loads) to efficiently navigate through the page, or the user may simply change his/her mind about retrieving the page for reasons other than poor QoS. Thus, only a subset of aborted client accesses of web pages may be relevant to poor website QoS or poor network performance, while the other portion of aborted web page accesses may be relevant to client-specific browsing patterns. Accordingly, a desire exists for a technique that enables determination of whether aborted client accesses of data (e.g., a web page) on a server are truly indicative of the server's QoS.

Various embodiments of the present invention are now described with reference to the above figures, wherein like reference numerals represent like parts throughout the several views. As described further below, embodiments of the present invention use performance data to determine whether an aborted client access of server information (e.g., a web page) is indicative of poor QoS. For example, it may be determined whether the server's response time exceeded a defined threshold amount in serving up a requested web page in order to determine whether the page access was likely aborted because of poor QoS. For instance, if the server's response time in serving up a requested web page exceeds a defined threshold time, then it may be determined that the aborted client access of such page is indicative of client-perceived poor QoS provided by the server. Thus, among the aborted client accesses of web pages from a server, the client accesses having a high response time from the server (i.e., the overall time observed by the client to retrieve the page and its embedded objects) that exceeds a defined threshold may be determined, and those aborted client accesses having a high response time may be identified as being indicative of client-perceived poor QoS.

Further, certain embodiments of the present invention utilize performance data for a client's access of server information (e.g., web page) to determine latency that is attributable to server-related performance issues and latency that is attributable to network-related performance issues. That is, for those client accesses of server information that are determined to have a high response time, two basic reasons leading to the poor performance may be determined: 1) server-related performance issues (e.g., high web server processing time for a web page due, for example, to server overload), and 2) network-related performance issues (e.g., high network transfer time for a web page due, for example, to network congestion and/or low bandwidth available to a client). Accordingly, in certain embodiments, it may be determined whether an aborted client access of server information had a high response time that is attributable to the server's performance, as opposed to the network's performance, from which a determination may be made as to whether such aborted access is indicative of poor QoS provided by the server. Thus, certain embodiments of the present invention are operable to distinguish whether the performance reasons (e.g., server overload or poor network latency) lead to the aborted client accesses of server information, or whether the aborted accesses are unrelated to the server's QoS but instead reflect client-specific browsing patterns.

Turning to FIG. 1, an example client-server system 100 is shown in which embodiments of the present invention may be implemented. As shown, one or more servers 101A-101D may provide services (information) to one or more clients, such as clients A-C (labeled 104A-104C, respectively), via communication network 103. Communication network 103 is preferably a packet-switched network, and in various implementations may comprise, as examples, the Internet or other Wide Area Network (WAN), an Intranet, Local Area Network (LAN), wireless network, Public (or private) Switched Telephony Network (PSTN), a combination of the above, or any other communications network now known or later developed within the networking arts that permits two or more computers to communicate with each other.

In a preferred embodiment, servers 101A-101D comprise web servers that are utilized to serve up web pages to clients A-C via communication network 103 in a manner as is well known in the art. Accordingly, system 100 of FIG. 1 illustrates an example of servers 101A-101D serving up web pages, such as web page 102, to requesting clients A-C. Of course, embodiments of the present invention are not limited in application to relating aborted client accesses of web pages to web server QoS, but may instead be implemented for relating aborted client accesses of other types of information provided by a server to the server's QoS. Thus, while various examples are provided herein for relating aborted client accesses of web pages to a web server's QoS, it should be understood that such examples are intended to render the disclosure enabling for relating aborted client accesses of various other types of server information to the server's QoS.

In the example of FIG. 1, web page 102 comprises an HTML (or other mark-up language) file 102A (which may be referred to herein as a "main page"), and several embedded objects (e.g., images, etc.), such as $Object_1$ and $Object_2$. Techniques for serving up such web page 102 to requesting clients A-C are well known in the art, and therefore such techniques are only briefly described herein. In general, a browser, such as browsers 105A-105C, may be executing at a client computer, such as clients A-C. To retrieve a desired web page 102, the browser issues a series of HTTP requests for all objects of the desired web page. For instance, various client requests and server responses are communicated between client A and server 101A in serving web page 102 to client A, such as requests/responses 106A-106F (referred to collectively herein as requests/responses 106). Requests/responses 106 provide a simplified example of the type of interaction typically involved in serving a desired web page 102 from server 101A to client A. As those of skill in the art will appreciate, requests/responses 106 do not illustrate all interaction that is involved through TCP/IP communication for serving a web page to a client, but rather provides an illustrative example of the general interaction between client A and server 101A in providing web page 102 to client A.

When a client clicks a hypertext link (or otherwise requests a URL) to retrieve a particular web page, the browser first establishes a TCP connection with the web server by sending a SYN packet (not shown in FIG. 1). If the server is ready to process the request, it accepts the connection by sending back a second SYN packet (not shown in FIG. 1) acknowledging the client's SYN. At this point, the client is ready to send HTTP requests 106 to retrieve the HTML file 102A and all embedded objects (e.g., $Object_1$ and $Object_2$), as described below.

First, client A makes an HTTP request 106A to server 101A for web page 102 (e.g., via client A's browser 105A). Such request may be in response to a user inputting the URL for web page 102 or in response to a user clicking on a hyperlink to web page 102, as examples. Server 101A receives the HTTP request 106A and sends HTML file 102A (e.g., file "index.html") of web page 102 to client A via response 106B. HTML file 102A typically identifies the various objects embedded in web page 102, such as $Object_1$ and $Object_2$. Accordingly, upon receiving HTML file 102A, browser 105A requests the identified objects, $Object_1$ and $Object_2$, via requests 106C and 106E. Upon server 101A receiving the requests for such objects, it communicates each object individually to client A via responses 106D and 106F, respectively. As illustrated by the generic example of FIG. 1, each object of a requested web page is retrieved from a server by an individual HTTP request made by the client. A client request and corresponding server response (e.g., HTTP request-response pair) may be referred to collectively herein as a "transaction" (e.g., an HTTP transaction).

Again, the above interactions are simplified to illustrate the general nature of requesting a web page, from which it should be recognized that each object of a web page is requested individually by the requesting client and is, in turn, communicated individually from the server to the requesting client. The above requests/responses 106 may each comprise multiple packets of data. Further, the HTTP requests can, in certain implementations, be sent from a client through one persistent TCP connection with server 101A, or, in other implementations, the requests may be sent through multiple concurrent connections. Server 101A may also be accessed by other clients, such as clients B and C of FIG. 1, and various web page objects may be communicated in a similar manner to those clients through packet communication 107 and 108, respectively.

Figure 2:
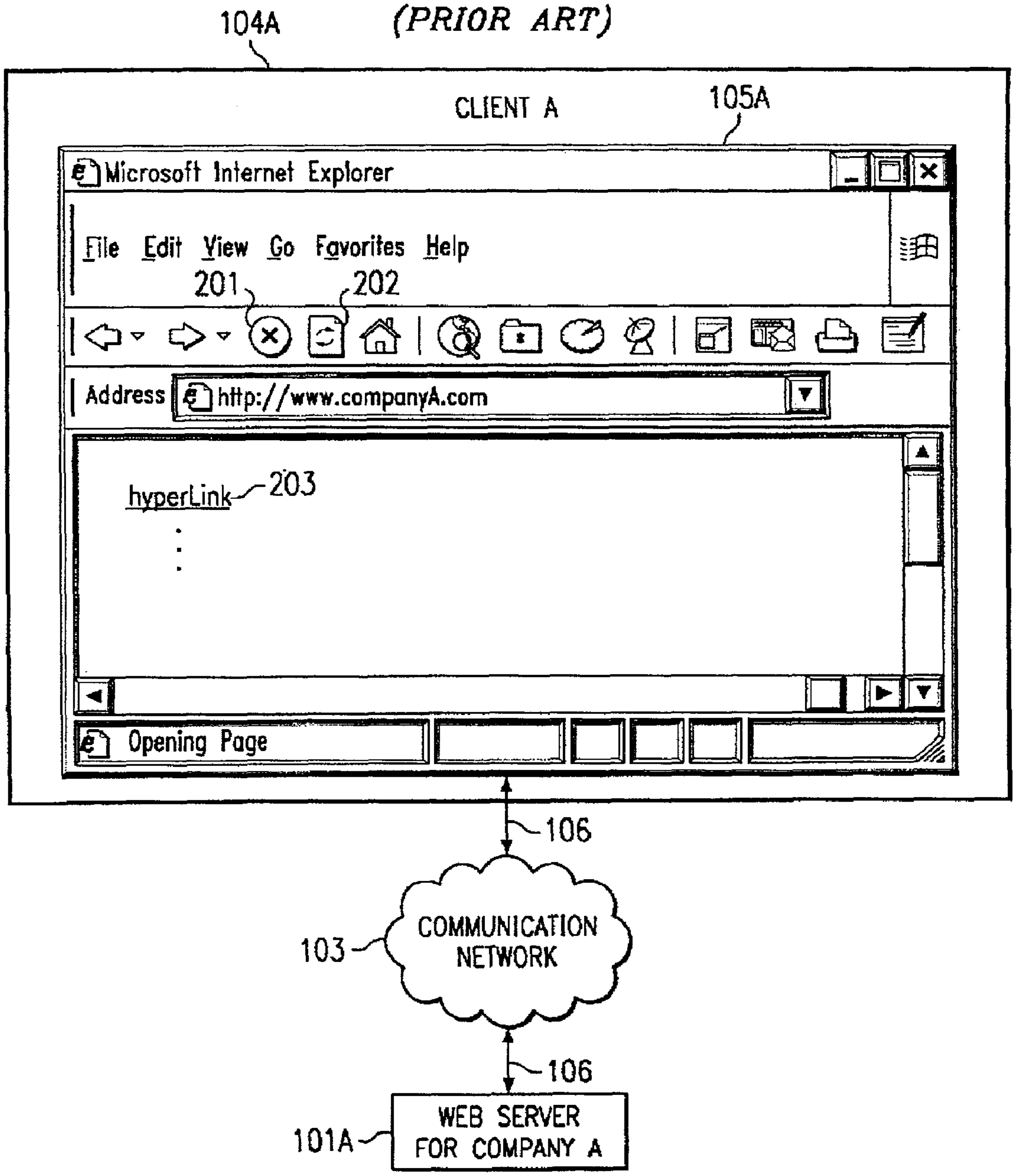
FIG. 2 (PRIOR ART)
FIG. 2 shows an example of interrupting actions that may be initiated at a browser executing on a client to abort the client's access of data on a server.

One way to measure the QoS of a web server is to measure the number of aborted client accesses of web pages provided by the web server. As shown in the example of FIG. 2, various user actions at the browser level can effectively interrupt the request/response exchange for fetching page objects at any time. For instance, suppose client A (104A) is interacting with server 101A of "Company A" via transactions 106 over communication network 103 to receive a web page (e.g., web page 102 of FIG. 1) having a URL "www.CompanyA.com". Before the page is fully loaded to client A (e.g., before all of the page's embedded objects are downloaded to client A), a user of browser 105A executing on client A may take some action to interrupt the page loading. As an example, a user may activate "stop" button 201 (e.g., by clicking such stop button 201 with a pointing device, such as a mouse or trackball), which aborts the client's access of the web page that is loading. It should be recognized that certain aborted accesses include aborting the client's network connection with the web server. For example, a user clicking stop button 201 generally results in aborting the client's TCP connection with web server 101A.

As another example of an interrupting action, a user may activate "refresh" button 202 while the requested page is loading, causing the TCP connection with web server 101A to be aborted and a new connection established to reload the page. As an example of a further interrupting action, a user may "quick click" on a hyperlink, such as hyperlink 203, that is displayed before the requested page loads completely, thus causing the client's TCP connection for the originally requested page "www.CompanyA.com" to be aborted.

In view of the above, it should be recognized that not all aborted client accesses of a web page are indicative of poor QoS. For instance, a user may interrupt a page load for reasons other than the client perceiving the QoS being poor for the page. For example, the user may be familiar with the page loading and may quick click on a hyperlink (i.e., before the page fully loads) to efficiently navigate through the page, or the user may simply change his/her mind about retrieving the page for reasons other than poor QoS. Thus, only a subset of aborted client web page accesses may be relevant to poor website QoS or poor network performance, while the other portion of aborted accesses may be relevant to client-specific browsing patterns.

Various embodiments of the present invention relate aborted client accesses of server information (e.g., web page) to the server's QoS. That is, embodiments of the present invention enable a determination of whether an aborted client access of server information is indicative of poor server QoS. More specifically, embodiments of the present invention utilize performance data for an aborted client access of server information (e.g., web page) to determine whether such aborted access is likely related to poor server QoS.

Figure 3:
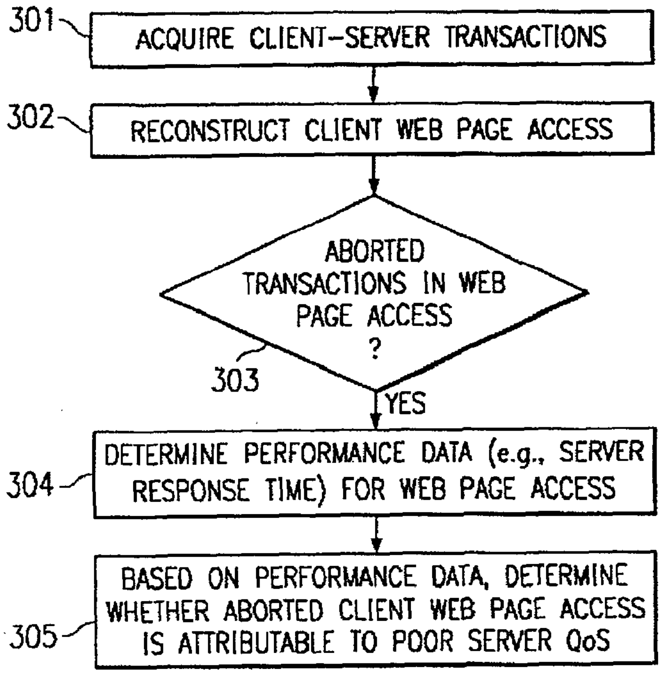
FIG. 3 shows an example operational flow diagram of a preferred embodiment of the present invention.

Turning to FIG. 3, an example operational flow diagram of a preferred embodiment of the present invention is shown. In operational block 301, client-server transactions are acquired. For example, information relating to client-server transactions, such as transactions 106 of FIG. 1, may be collected. Preferably, a Transaction Log, as described further below, is generated that comprises collected information relating to client-server transactions. In operational block 302, a client access of a server (e.g., a client web page access) is reconstructed. For example, as described with FIG. 1 above, a client access of a web page may comprise a plurality of separate transactions. Thus, in operational block 302, the various transactions that comprise a given client access of a server (e.g., of a web page) may be related together. Preferably, a Web Page Session Log, as described further below, is generated that comprises collected information for transactions organized by the web page access to which the transactions correspond.

In block 303, a determination is made as to whether a client web page access comprises an aborted client transaction with the web server. That is, for the reconstructed web page accesses, those accesses that comprise at least one aborted transaction are identified. If a transaction of a web page access is aborted, then it is known that such web page access was aborted. As described further below, various techniques may be utilized for detecting the aborted client accesses of a web page.

If it is determined in block 303 that one or more of the reconstructed web page accesses have aborted transactions (meaning that one or more web page accesses were aborted), then operation advances to block 304 for at least such one or more aborted accesses. In operation block 304, performance data, such as server response time, is determined for at least the aborted accesses. Thereafter, in operational block 305, the determined performance data is used to determine whether each of the aborted accesses is attributable to poor server QoS. For instance, if the performance data for a given aborted web page access indicates that the server's response time was above a defined threshold, then it may be concluded in block 305 that the given aborted web page access is likely attributable to poor server QoS.

Figure 4:
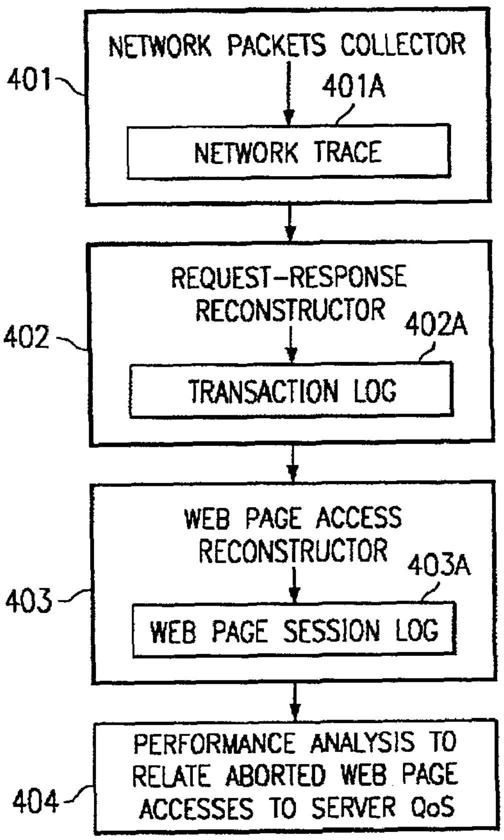
FIG. 4 shows a block diagram of an example implementation for reconstructing client web page accesses from transactions and using performance data to relate the aborted client accesses of information on a server to the server's QoS in accordance with one embodiment of the present invention.

FIG. 4 shows a block diagram of an example implementation for reconstructing client web page accesses from transactions and using performance data to relate the aborted web page accesses to server QoS in accordance with one embodiment of the present invention. As shown, this example embodiment comprises network packets collector module 401, request-response reconstructor module 402 (which may be referred to herein as transaction reconstructor module 402), and web page access reconstructor module 403. As described further hereafter, performance analysis module 404 is included for performing performance analysis (e.g., measuring client-perceived end-to-end performance) for aborted web page accesses to relate such aborted accesses to server QoS. Examples of reconstructing client web page accesses from client-server transactions that may be implemented in accordance with embodiments of the present invention are described in greater detail in U.S. patent application Ser. No. 10/147,256, now U.S. Pat. No. 7,487,508 entitled "SYSTEM AND METHOD FOR RECONSTRUCTING CLIENT WEB PAGE ACCESSES FROM CAPTURED NETWORK PACKETS" and in U.S. patent application Ser. No. 10/147,619 now U.S. Pat. No. 7,246,101 entitled "KNOWLEDGE-BASED SYSTEM AND METHOD FOR RECONSTRUCTING CLIENT WEB PAGE ACCESSES FROM CAPTURED NETWORK PACKETS", the disclosures of which are incorporated herein by reference.

In this example embodiment, network packets collector module 401 is operable to collect network-level information that is utilized to reconstruct web page accesses. More specifically, in this example embodiment, network packets collector module 401 utilizes a tool to capture network packets, such as the publicly available UNIX tool known as "tcpdump" or the publicly available WINDOWS tool known as "WinDump." The software tools "tcpdump" and "WinDump" are well-known and are commonly used in the networking arts for capturing network-level information for network "sniffer/analyzer" applications. Typically, such tools are used to capture network-level information for monitoring security on a computer network (e.g., to detect unauthorized intruders, or "hackers", in a system). Of course, other tools now known or later developed for capturing network-level information, or at least the network-level information utilized by embodiments of the present invention, may be utilized in alternative embodiments of the present invention.

Network packets collector module 401 records the captured network-level information (e.g., network packets) to a Network Trace file 401A. This approach allows the Network Trace 401A to be processed in offline mode. For example, tcpdump may be utilized to capture many packets (e.g., a million packets) for a given period of time (e.g., over the course of a day), which may be compiled in the Network Trace 401A. Thereafter, such collected packets in the Network Trace 401A may be utilized by request-response reconstructor module 402 in the manner described further below. While this example embodiment utilizes a tool, such as tcpdump, to collect network information for offline processing, known programming techniques may be used, in alternative embodiments, to implement a real-time network collection tool. If such a real-time network collection tool is implemented in network packets collector module 401, the various other modules of FIG. 4 may be similarly implemented to use the real-time captured network information to reconstruct web page accesses (e.g., in an on-line mode of operation).

From the Network Trace 401A, request-response reconstructor module 402 reconstructs all TCP connections and extracts HTTP transactions (e.g., a request with the corresponding response) from the payload of the reconstructed TCP connections. More specifically, in one embodiment, request-response reconstructor module 402 rebuilds the TCP connections from the Network Trace 401A using the client IP addresses, client port numbers and the request (response) TCP sequence numbers. Within the payload of the rebuilt TCP connections, the HTTP transactions may be delimited as defined by the HTTP protocol. Meanwhile, the timestamps, sequence numbers and acknowledged sequence numbers may be recorded for the corresponding beginning or end of HTTP transactions. After reconstructing the HTTP transactions, request-response reconstructor module 402 may extract HTTP header lines from the transactions. The HTTP header lines are preferably extracted from the transactions because the payload does not contain any additional useful information for reconstructing web page accesses, but the payload requires approximately two orders of magnitude of additional storage space. The resulting outcome of extracting the HTTP header lines from the transactions is recorded to a Transaction Log 402A, which is described further below. That is, after obtaining the HTTP transactions, request-response reconstructor module 402 stores some HTTP header lines and other related information from Network Trace 401A in Transaction Log 402A for future processing (preferably excluding the redundant HTTP payload in order to minimize storage requirements).

A methodology for rebuilding HTTP transactions from TCP-level traces was proposed by Anja Feldmann in "BLT: Bi-Layer Tracing of HTTP and TCP/IP", Proceedings of WWW-9, May 2000, the disclosure of which is hereby incorporated herein by reference. Balachander Krishnamurthy and Jennifer Rexford explain this mechanism in more detail and extend this solution to rebuild HTTP transactions for persistent connections in "Web Protocols and Practice: HTTP/1.1, Networking Protocols, Caching, and Traffic Measurement" pp. 511-522, Addison Wesley, 2001, the disclosure of which is also hereby incorporated herein by reference. Accordingly, in this example embodiment, request-response reconstructor module 402 uses such methodology for rebuilding HTTP transactions from TCP-level traces.

In an alternative embodiment, Transaction Log 402A may be generated in a kernel-level module implemented on the server as described in greater detail in U.S. patent application Ser. No. 10/147,249, now U.S. Pat. No. 7,437,451 titled "SYSTEM AND METHOD FOR COLLECTING DESIRED INFORMATION FOR NETWORK TRANSACTIONS AT THE KERNEL LEVEL," the disclosure of which is hereby incorporated herein by reference. Such alternative embodiment may be desired because, for example, it enables information for transactions to be collected at the kernel level of a server (e.g., a web server), which may avoid rebuilding the transactions at the user level as in the methodology proposed by Anja Feldmann. Such alternative embodiment may enable greater computing efficiency in generating Transaction Log 402A because the transactions are not required to be reconstructed at the user level, and/or it may require less storage space because only the desired information for transactions may be communicated from the kernel level to the user level as opposed to the raw network information of Network Trace 401A being stored at the user level (which may include much more information than is desired for each transaction), as described further in the above-referenced U.S. Patent Application "SYSTEM AND METHOD FOR COLLECTING DESIRED INFORMATION FOR NETWORK TRANSACTIONS AT THE KERNEL LEVEL."

Once Transaction Log 402A is generated (e.g., either from Network Trace 401A or from a kernel level module), the transactions thereof may be related to their corresponding client web page access. As described above, a web page is generally composed of one HTML file and some embedded objects, such as images or JAVASCRIPTS. When a client requests a particular web page, the client's browser should retrieve all the page-embedded images from a web server in order to display the requested page. The client browser retrieves each of these embedded images separately. As illustrated by the generic example of FIG. 1, each object of a requested web page is retrieved from a server by an individual HTTP request made by the client. An HTTP request-response pair may be referred to collectively herein as an HTTP "transaction." Entries of Transaction Log 402A contain information about these individual HTTP transactions (i.e., requests/responses).

Thus, once information about various individual HTTP transactions is collected in Transaction Log 402A, the next step in reconstructing a web page access is to relate the different individual HTTP transactions in the sessions corresponding to a particular web page access. That is, the various different HTTP transactions collected in Transaction Log 402A are related together as logical web pages. In the example embodiment of FIG. 4, web page access reconstructor module 403 is responsible for grouping the underlying physical object retrievals together into logical web pages, and stores them in Web Page Session Log 403A. More specifically, web page access reconstructor module 403 analyzes Transaction Log 402A and groups the various different HTTP transactions that correspond to a common web page access. Thus, Web Page Session Log 403A comprises the HTTP transactions organized (or grouped) into logical web page accesses. Again, an example implementation of web page reconstructor module 403 is described in greater detail in U.S. patent application Ser. No. 10/147,256, now U.S. Pat. No. 7,487,508 entitled "SYSTEM AND METHOD FOR RECONSTRUCTING CLIENT WEB PAGE ACCESSES FROM CAPTURED NETWORK PACKETS" and in U.S. patent application Ser. No. 10/147,619 now U.S. Pat. No. 7,246,101 entitled "KNOWLEDGE-BASED SYSTEM AND METHOD FOR RECONSTRUCTING CLIENT WEB PAGE ACCESSES FROM CAPTURED NETWORK PACKETS", the disclosures of which are incorporated herein by reference.

After different request-response pairs (i.e., HTTP transactions) are grouped into web page retrieval sessions in Web Page Session Log 403A, performance analysis module 404 may be utilized in accordance with various embodiments of the present invention to relate the aborted client web page accesses to server QoS. For instance, performance analysis module 404 may, for each web page access of Web Page Session Log 403A, determine whether any transactions in such web page access were aborted. If the web page access includes aborted transaction(s), then such web page access is considered to be aborted. If the client's web page access was aborted, performance analysis module 404 may evaluate the response time for serving up the web page to the client that was encountered before the access was aborted. For example, the client-perceived end-to-end response time for a web page download before such web page download was aborted may be measured. If the response time is determined to be greater than a defined threshold, then it may be determined that the aborted client access of such web page is indicative of poor server QoS, as opposed, for example, to a client-specific browsing pattern.

It should be recognized that information acquired for client-server transactions (in Transaction Log 401A) may be used to relate aborted client web page accesses to server QoS. While Transaction Log 401A may comprise any desired network information in various implementations of alternative embodiments, Table 1 below describes in greater detail the format of an entry in HTTP Transaction Log 401A of a preferred embodiment of the present invention.

TABLE 1

| Field | Value |
|---|---|
| URL | The URL of the transaction. |
| Referer | The value of the header field Referer, if it exists. |
| Content Type | The value of the header field Content-Type in the responses. |
| Flow ID | A unique identifier to specify the TCP connection of this transaction. |
| Source IP | The client's IP address. |
| Request Length | The number of bytes of the HTTP request. |
| Response Length | The number of bytes of the HTTP response. |
| Content Length | The number of bytes of HTTP response body. |
| Request SYN timestamp | The timestamp of the SYN packet from the client. |
| Request Start timestamp | The timestamp for receipt of the first byte of the HTTP request. |
| Request End timestamp | The timestamp for receipt of the last byte of the HTTP request. |
| Start of Response | The timestamp when the first byte of response is sent by the server to the client |
| End of Response | The time stamp when the last byte of response is sent by the server to the client |
| ACK of Response Timestamp | The ACK packet from the client for the last byte of the HTTP response. |
| Response Status | The HTTP response status code. |
| Via Field | Identification of whether the HTTP field Via is set. |
| Aborted | Identification of whether the TCP connection aborted. |
| Resent Request Packets | The number of packets resent by the client. |
| Resent Response Packet | The number of packets resent by the server. |

The first field provided in the example Transaction Log entry of Table 1 is the URL field, which stores the URL for the HTTP transaction (e.g., the URL for the object being communicated to the client in such transaction). The next field in the entry is the Referer field. As described above with FIG. 1, typically when a web page is requested, an HTML file 102A is first sent to the client, such as a file "index.html", which identifies the object(s) to be retrieved for the web page, such as $Object_1$ and $Object_2$ in the example of FIG. 1. When the objects for the requested web page (e.g., $Object_1$ and $Object_2$) are retrieved by the client via HTTP transactions (in the manner described above with FIG. 1), the Referer field identifies that those objects are embedded in (or are part of) the requested web page (e.g., the objects are associated with the index.html file in the above example). Accordingly, when transactions for downloading various different objects have the same Referer field, such objects belong to a common web page. The HTTP protocol defines such a Referer field, and therefore, the Referer field for a transaction may be taken directly from the captured Network Trace information for such transaction. More specifically, in the HTTP protocol, the referer request-header field allows the client to specify, for the server's benefit, the address (URI) of the resource from which the Request-URI was obtained (i.e., the "referrer", although the header field is misspelled). The referer request-header allows a server to generate lists of back-links to resources for interest, logging, optimized caching, etc. In view of the above, the Referer field of a transaction directly identifies the web page to which the object of such transaction corresponds.

The next field provided in the example entry of Table 1 is the Content Type field, which identifies the type of content downloaded in the transaction, such as "text/html" or "image/jpeg", as examples. The next field in the entry is Flow ID, which is a unique identifier to specify the TCP connection of this transaction. The next field in the entry is Source IP, which identifies the IP address of a client to which information is being downloaded in the transaction.

The next field in the example entry of Table 1 is the Request Length field, which identifies the number of bytes of the HTTP request of the transaction. Similarly, the Response Length field is included in the entry, which identifies the number of bytes of the HTTP response of the transaction. The Content Length field is also included, which identifies the number of bytes of the body of the HTTP response (e.g., the number of bytes of an object being downloaded to a client).

The next field in the example entry of Table 1 is the Request SYN timestamp, which is the timestamp of the SYN packet from the client. As described above, when a client clicks a hypertext link (or otherwise requests a URL) to retrieve a particular web page, the browser first establishes a TCP connection with the web server by sending a SYN packet. If the server is ready to process the request, it accepts the connection by sending back a second SYN packet acknowledging the client's SYN. Only after this connection is established can the true request for a web page be sent to the server. Accordingly, the Request SYN timestamp identifies when the first attempt to establish a connection occurred. This field may be used, for example, in determining the latency breakdown for a web page access to evaluate how long it took for the client to establish the connection with the server.

The next field in the entry is the Request Start timestamp, which is the timestamp for receipt of the first byte of the HTTP request of the transaction. Accordingly, this is the timestamp for the first byte of the HTTP request that is received once the TCP connection has been established with the server. The Request End timestamp is also included as a field in the entry, which is the timestamp for receipt of the last byte of the HTTP request of the transaction.

The next field in the entry is the Start of Response field, which identifies the timestamp when the first byte of the response is sent by the server to the client. The entry next includes an End of Response field, which identifies the timestamp when the last byte of the response is sent by the server to the client. The next field in the entry is ACK of Response timestamp, which is the timestamp of the ACK packet (acknowledge packet) from the client for the last byte of the HTTP response of the transaction. As an example, the Request Start timestamp, Request End timestamp, and ACK of Response timestamp fields may be used (e.g., by performance analysis module 403) in measuring the end-to-end performance perceived by the client for a web page access in certain implementations.

The next field in the example entry of Table 1 is the Response Status field, which is the HTTP response status code. For example, the response status code may be a "successful" indication (e.g., status code "200" in HTTP) or an "error" indication (e.g., status code "404" in HTTP). Typically, upon receiving a client's request for a web page (or object embedded therein), the web server provides a successful response (having status code "200"), which indicates that the web server has the requested file and is downloading it to the client, as requested. However, if the web server cannot find the requested file, it may generate an error response (having status code "404"), which indicates that the web server does not have the requested file.

The next field in the example entry of Table 1 is the Via field, which is typically set by a proxy of a client. If the client request is received by the server from a proxy, then typically proxies add their request field in the Via field. Thus, the Via field indicates that in fact its not the original client who requested this file, or who is making this request, but rather it is the proxy acting on behalf of the client.

The next field in the example entry of Table 1 is the Aborted field, which indicates whether the current transaction was aborted. For example, the Aborted field may indicate whether the client's TCP connection for such transaction was aborted. As described further below, various techniques may be used to detect whether the client's TCP connection with the server and the current transaction, in particular, is aborted.

The next field in the entry is the Resent Request Packets field, which provides the number of packets resent by the client in the transaction. The Resent Response Packet field is the final field in the entry, which provides the number of packets resent by the server in the transaction. These fields may provide information about the network status during the transaction. For instance, if it was necessary for the server to re-send multiple packets during the transaction, this may be a good indication that the network was very congested during the transaction.

As described in conjunction with FIG. 4 above, some fields of the HTTP Transaction Log entry may be used to rebuild web pages (e.g., via web page access reconstructor module 402), such as the URL, Referer, Content Type, Flow ID, Source IP, Request Start timestamp, and Response End timestamp fields. Examples of reconstructing web page accesses in this manner are further described in U.S. patent application Ser. No. 10/147,256, now U.S. Pat. No. 7,487,508 entitled "SYSTEM AND METHOD FOR RECONSTRUCTING CLIENT WEB PAGE ACCESSES FROM CAPTURED NETWORK PACKETS" and U.S. patent application Ser. No. 10/147,619, now U.S. Pat. No. 7,246,101 entitled "KNOWLEDGE-BASED SYSTEM AND METHOD FOR RECONSTRUCTING CLIENT WEB PAGE ACCESSES FROM CAPTURED NETWORK PACKETS." Other fields of the HTTP Transaction Log entry may be used to measure end-to-end performance for a web page access. For example, the Request Start timestamp and the Response End timestamp fields can be used together to calculate the end-to-end response time. The number of resent packets can reflect the network condition.

As an example of network-level information that may be captured and used to populate certain of the above fields of Table 1, consider the following example requests and responses (transaction) for retrieving "index.html" page with the embedded image "imgl.jpg" from a web server "www.hpl.hp.com":

Transaction 1:
Request: Get/index.html HTTP/1.0
  Host: www.hpl.hp.com
Response: HTTP/1.0 200 0K
  Content-Type: text/html Transaction 2:
Request: Get/imgl.jpg HTTP/1.0
  Host: www.hpl.hp.com
  Referer: http://www.hpl.hp.com/index.html
Response: HTTP/1.0 200 OK
  Content-Type: image/jpeg In the above example, the first request is for the HTML file index.html. The content-type field in the corresponding response shows that it is an HTML file (i.e., content type of "text/html"). Then, the next request is for the embedded image imgl.jpg. The request header field referer indicates that the image is embedded in index.html. The corresponding response shows that the content type for this second transaction is an image in jpeg format (i.e., content type of "image/jpeg"). It should be noted that both of the transactions above have a status "200" (or "OK") returned, which indicates that they were successful.

To use aborted client accesses of a web page as indicators of poor QoS, it is first necessary to detect such aborted client accesses. In a preferred embodiment, a client web page access is considered to be aborted if at least one of the transactions comprising the client access is aborted. In other words, a client web page access is considered to be aborted if one of the TCP connections used to retrieve an object of the page is aborted. Preferably, upon detecting an aborted transaction of a client web page access, such aborted access is indicated in the corresponding transaction entry of Transaction Log 402A (e.g., in the Aborted field of the example transaction entry of Table 1 described above). Detection of aborted web page accesses can be performed in at least three different ways: 1) in software implemented on the client (e.g., in the client's browser), 2) in software implemented on the server, or 3) from the server-side logs.

The first approach for detecting aborted web page accesses involves modifications or annotation of the software executing on the clients, and considering the installed base of more than 100 million web browsers, such an implementation may require a significant number of updates to be made. The second approach is supported by some web servers and has been used in a study by Arlitt et al. See M. Arlitt and C. Williamson, "Web server workload characterization: the search for invariants" in Proceedings of the ACM SIGMETRICS '96 *Conference, Philadelphia, Pa., May* 1996, the disclosure of which is hereby incorporated herein by reference. One drawback with this approach, however, is that it is not supported on all web servers, such as APACHE, NETSCAPE LITE, and others.

The third approach extracts this information from the web access logs generated at the web server by 1) first estimating the real size of the document; and 2) if the number of transferred bytes is less than the real size it can either be that the document got modified or that the client actually aborted the access thereof. See L. Cherkasova and M. Karlsson, "Dynamics and Evolution of Web Sites: Analysis, Metrics and Design Issues", Proceedings of the Sixth International Symposium on Computers and Communications (ISCC '01), Hammamet, Tunisia, Jul. 3-5, 2001, the disclosure of which is hereby incorporated herein by reference, in which a method is proposed to filter out the modifications from the aborted accesses relying on the assumption that modifications to a document generate one change in the transferred bytes followed by the same size for a time, while an aborted access manifests itself as a one-time change in the number of transferred bytes. However, this technique does not work very well for rarely accessed documents because, if the document is accessed only once or twice, there is not enough information to derive a real document size and to identify the aborted client accesses based on this.

In a preferred embodiment of the present invention, aborted client accesses of server information (e.g., web page) are detected using network packet level information collected on the web server side of the client-server network. More specifically, a preferred embodiment uses two basic observations available from the TCP/IP packets to detect aborted web page accesses: 1) a RST packet sent by the HTTP client to a sever that explicitly indicates the aborted connection, and 2) a FIN packet with ACK sent by an HTTP client to a server where the acknowledged sequence number is less than the observed maximum sequence number sent from the server. If either of the above situations are detected for a TCP connection, then it is determined that the client's TCP connection with the server (and the current transaction, in particular) was aborted by the client. This technique for detecting aborted transactions is preferably implemented in operational block 303 of FIG. 3 described above. As is well known in the art, "RST packet" stands for "connection reset" (i.e., prematurely closing the current TCP connection), and "FIN packet" stands for "finishing the connection". It may be determined that the connection closed normally if the ACK (acknowledged) sequence number coincides with the last ACK sequence number sent by the server (because all of the packets sent from the server are acknowledged by the client). However, if the ACK sequence number is less than the maximum sequence number sent from the server (as in situation #2 above), then it may be determined that the connection was aborted prematurely.

Once an aborted client access of server information is detected, performance data for such aborted access may be used in determining whether it is reflective of poor server QoS. For example, the client-perceived response time for a requested web page prior to the access of such web page being aborted may be determined. And, if such response time is greater than a defined threshold, it may be determined that the aborted page access is likely attributable to poor server QoS. Currently, most website providers set a target client-perceived end-to-end time of less than six seconds for their web pages. That is, website providers typically like to provide their requested web pages to a client in less than six seconds from the time the client requests the page. Accordingly, the defined threshold against which the response time may be compared to determine whether an aborted page access is attributable to poor server QoS may be implemented as six seconds. Of course, any other suitable threshold above which a server's response time may be considered as poor may be used in relating aborted client accesses of server information (e.g., a web page) to poor server QoS.

Further, in a preferred embodiment, the performance data for aborted client web page accesses enables a determination of latency in the response time that is attributable to the server (e.g., server processing time) and the latency that is attributable to the network due, for example, to network congestion. That is, performance data for a client's access of a web page provided by a server may be utilized to determine latency that is attributable to server-related performance issues, such as high server processing time due, for example, to server overload (e.g., too many processes running on the server), as well as latency that is attributable to network-related performance issues (e.g., high network transfer time for a web page due, for example, to network congestion and/or low bandwidth available to a client). Accordingly, a preferred embodiment is operable to determine whether an aborted client access of server information had a high response time that is attributable to the server's performance, as opposed to the network's performance. Therefore, a preferred embodiment may determine whether such aborted access is indicative of poor QoS provided by the server. For instance, if an aborted client access of a web page had a high response time that is mostly attributable to network latency, then such aborted access may be determined to not be related to poor server QoS. However, if an aborted web page access had a high response time that is mostly attributable to server latency, then such aborted access may be determined to be related to poor server QoS.

Figure 5:
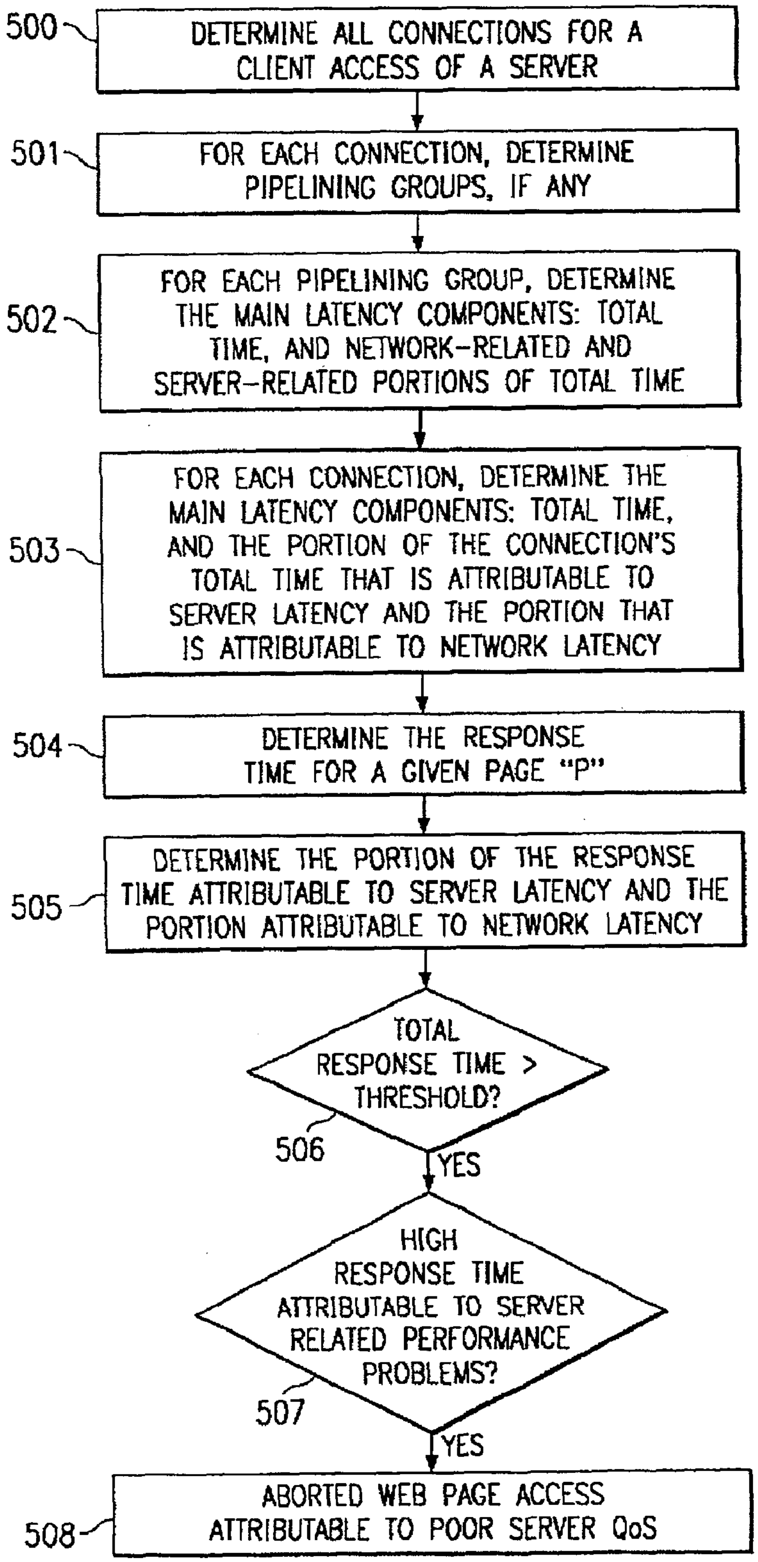
FIG. 5 shows an example operational flow for determining performance data for an aborted client access of information on a server and using such performance data to determine whether the aborted client access is related to poor server QoS in accordance with a preferred embodiment of the present invention.

The performance data used for determining whether an aborted client access of server information (e.g., a web page) is related to poor server QoS in a preferred embodiment is now described in greater detail. More specifically, a preferred embodiment for determining whether an aborted web page access is related to poor server QoS is described in conjunction with the example flow diagram of FIG. 5. FIG. 5 shows an example operational flow for implementing operational blocks 304 and 305 of FIG. 3 for determining performance data for an aborted web page access and using such performance data to determine whether the aborted access is related to poor server QoS. It should be understood that performance data may, in certain embodiments, be determined for web page accesses in the manner further described in U.S. patent application Ser. No. 10/146,967, now U.S. Publication No. 2003/0221000 entitled "SYSTEM AND METHOD FOR MEASURING WEB SERVICE PERFORMANCE USING CAPTURED NETWORK PACKETS", the disclosure of which is incorporated herein by reference.

As described above, when a client clicks a hypertext link to retrieve an HTML file, the browser first establishes a TCP connection with the web server by sending a SYN packet. If the server is ready to process the request, it accepts the connection by acknowledgment of the client's SYN. The exchange of the SYN packets is the beginning of a connection. Then, the browser begins to send an HTTP request for the HTML file through the TCP connection. For each request (related to the web page), we are concerned about the timestamps for the first byte and the last byte of the request since they delimit the request transfer time and the beginning of server processing. Similarly, we are also concerned about the timestamps of the beginning and the end of the HTTP response. Besides, the timestamp of the acknowledgment packet for the last byte of the response explicitly indicates that the browser has received the entire response.

A preferred embodiment uses the following functions to denote the critical timestamps for connection conn and request r:

$t_{syn}$(conn): time when the first SYN packet from the client is received by the server for establishing the connection conn;

$t_{req}^{start}$(r): time when the first byte of the request r is received by the server;

$t_{req}^{end}$(r): time when the last byte of the request r is received by the server;

$t_{resp}^{start}$(r): time when the first byte of the response for r is sent by the server; and $t_{resp}^{end}$(r): time when the last byte of the response for r is sent by the server.

Additionally, for a web page P, we have the following variables:

N: the number of distinct network connections, $conn_1, \ldots, conn_N$ (e.g., number of distinct TCP connections) used to retrieve the objects in the web page P (see e.g., operational block 500 of FIG. 5); and $$r_1^k, \ldots, r_{n_k}^k:$$

the requests for the objects retrieved through the connection $conn_k$ (k=1, . . . , N), and ordered according to the time when they were received, i.e., $$t_{req}^{end}(r_1^k) \le t_{req}^{end}(r_2^k) \le \ldots \le t_{req}^{end}(r_{n_k}^k).$$

The extended version of HTTP 1.0 and later version HTTP 1.1 introduce the concept of persistent connections and pipelining. See R T. Fielding, J. Gettys, J. Mogul, H. Nielsen, and T. Berners-Lee, "Hypertext Transfer Protocol—HTTP/1.1", RFC 2068, IETF, January 1997 (available at http://www.w3.org/Protocols/rfc2068/rfc2068). Persistent connections enable reuse of a single TCP connection for multiple object retrievals from the same IP address (typically embedded objects of a web page). Pipelining allows a client to make a series of requests on a persistent connection without waiting for the previous response to complete (the server, however, returns the responses in the same order as the requests are sent).

As shown in FIG. 5, in a preferred embodiment all distinct network connections, $conn_1, \ldots, conn_N$ (e.g., number of distinct TCP connections) that are used to retrieve the objects of a web page P are determined in operational block 500. In operational block 501 of FIG. 5, pipelining groups, if any, comprising transactions of each connection of a common client access of a server are determined. In a preferred embodiment, we consider the requests $$r_i^k, \ldots r_{n_k}^k$$

to belong to the same pipelining group (denoted as $$PipeGr = \{r_1^k, \ldots, r_{n_k}^k\})$$

if for any j such that $$i \le j-1 < j \le n,\ t_{req}^{start}(r_j^k) \le t_{resp}^{end}(r_{j-1}^k).$$

Thus for all the requests on the same connection $conn_k$:

$$r_1^k, \ldots, r_{n_k}^k,$$

we define the maximum pipelining groups in such a way that they do not intersect, e.g., $$\underbrace{r_1^k, \ldots, r_i^k}_{PipeGr_1}, \underbrace{r_{i+1}^k}_{PipeGr_2}, \ldots, \underbrace{r_{n_k}^k}_{PipeGr_l}.$$

In operational block 502, the main latency components are determined for each pipelining group. That is, for each of the pipelining groups, three portions of response time are defined in a preferred embodiment: 1) total response time (Total), 2) network-related portion (Network), and 3) lower-bound estimate of the server processing time (Server).

Let us consider the following example. For convenience, let us denote $$PipeGr_1 = \{r_1^k, \ldots, r_i^k\},$$

then $$\text{Total}(PipeGr_1) = t_{resp}^{end}(r_i^k) - t_{req}^{start}(r_1^k),$$

$$\text{Network}(PipeGr_1) = \sum_{j=1}^{i} (t_{resp}^{end}(r_j^k) - t_{resp}^{start}(r_j^k)), \text{ and}$$

$$\text{Server}(PipeGr_1)=\text{Total}(PipeGr_1)-\text{Network}(PipeGr_1).$$

If no pipelining exists, the pipelining groups consist of one request only. In this case, the computed server time represents precisely the server processing time for a given request-response pair (or transaction). In a preferred embodiment, we choose to account as server processing time only the server time that is explicitly exposed on the connection. If a connection adopts pipelining, the "real" server processing time might be larger than the computed server time because it can partially overlap with the network transfer time, and it is difficult to estimate the exact server processing time from the packet-level information. However, we are still interested to estimate the "non-overlapping" server processing time as this is the portion of the server time on a critical path of overall end-to-end response time. Thus, we use, as an estimate, the lower-bound server processing time, which is explicitly exposed in the overall end-to-end response.

Next, the connection setup time for each connection is determined. For instance, the client-perceived end-to-end time for retrieving a web page may include a certain amount of setup time for establishing the TCP connection with the server. In a preferred embodiment, if connection $conn_k$ is a newly established connection to retrieve a web page, we observe additional connection setup time:

$$Setup(conn_k) = t_{req}^{start}(r_1^k) - t_{syn}(conn_k).$$

Otherwise the setup time is 0, as it is already established. Additionally, we define $t^{start}(conn_k)=t_{syn}(conn_k)$ for a newly established connection, otherwise, $$t^{start}(conn_k) = t_{req}^{start}(r_1^k).$$

For each connection, the total time, as well as the portion of the total time that is attributable to server latency and the portion that is attributable to network latency, is computed, in operational block 503. For example, in a preferred embodiment, we define the latency breakdown for a given connection $conn_k$ as:

$$\text{Total}(conn_k) = \text{Setup}(conn_k) + t_{resp}^{end}(r_{n_k}^k) - t_{req}^{start}(r_1^k),$$

$$\text{Network}(conn_k) = \text{Setup}(conn_k) + \sum_{j=1}^{l} \text{Network}(PipeGr_j), \text{ and}$$

$$\text{Server}(conn_k) = \sum_{j=1}^{l} \text{Server}(PipeGr_j).$$

In operational block 504, the response time is determined for a given page "P" that is accessed via client connection(s) under consideration, which may comprise multiple concurrent connections). In operational block 505, the portion of the response time that is attributable to server latency and the portion that is attributable to network latency are determined. The latencies for a given page P may be defined in a preferred embodiment as:

$$\text{Total}(P) = \max_{j \le N} t_{resp}^{end}\left(r_{n_j}^{j}\right) - \min_{j \le N} t^{start}(conn_j),$$

$$CumNetwork(P) = \sum_{j=1}^{N} \text{Network}(conn_j), \text{ and}$$

$$CumServer(P) = \sum_{j=1}^{N} \text{Server}(conn_j).$$

The functions CumNetwork(P) and CumServer(P) above give the sum of all the network-related and server processing portions of the response time over all connections used to retrieve the web page.

Now the response time may be evaluated to determine whether an aborted web page access is likely attributable to poor server QoS. In operational block 506 of FIG. 5, a determination is made as to whether the aborted web page access under evaluation has a total response time that is greater than a defined threshold (e.g., six seconds). For instance, let $X_{EtE}$ be a defined end-to-end time threshold of responses: i.e., if the download time for a web page (with embedded images) is greater than $X_{EtE}$, then it is considered to be unsatisfactory due to high response time. Accordingly, for the aborted page accesses, a preferred embodiment distinguishes the subset of pages $\Pi_{bad}$ that have a response time higher than the given threshold $X_{EtE}$: $\Pi_{bad}=\{P|P\in\Pi \;\&\; \text{Total}(P)\geqq X_{E+E}\}$.

The subset $\Pi_{bad}$ of all aborted pages II are the pages that might be reflective of poor server QoS. The rest of the pages from Π are determined to be aborted due to client browsing patterns rather than poor server QoS experienced by the client.

A preferred embodiment next distinguishes the reasons leading to a poor response time. For example, a preferred embodiment may determine whether a poor response time is due to network-related performance problems (e.g., high network latency), or server-related performance problems (e.g., high server latency), or both. Thus, if it is determined in block 506 that the total response time for an aborted web page access is greater than a defined threshold, operation advances to block 507 whereat a determination is made as to whether the high response time is attributable to server related performance problems. For this purpose, we introduce the following page service time ratio, which is used in a preferred embodiment: PageServiceRatio(P)=CumNetwork(P)/CumServer(P).

If the PageServiceRatio(P)≧1, then it is determined in a preferred embodiment that the high response time is due to network related performance problems (e.g., high network latency due, for example, to network congestion). If, on the other hand, PageServiceRatio(P)≦1, then it is determined in a preferred embodiment that the high response time is due to server related performance problems (e.g., high server latency due, for example, to server overload). If it is determined in operational block 507 that the high response time is due to server related performance problems, then it is determined in block 508 that the aborted web page access under evaluation is attributable to poor server QoS.

To exemplify how a preferred embodiment of the present invention may be used to characterize the reasons leading to aborted web pages, we analyzed the aborted web pages from the Hewlett Packard (HP) Labs website. The most frequently accessed web page in our study was index.html. Below we describe the recognized performance analysis corresponding to aborted downloads of this page. Our collected data covered a time interval of almost 3 days from 17:08:43 on Aug. 7, 2001 (Wednesday) to 16:15:50 on Aug. 10, 2001 (Saturday). From the total number of requests (i.e., 4,028) to this page during the studied time interval, the aborted pages account for 662 requests, which is 16.4% of the total. The average page size is 43,892 bytes (that is the sum of all embedded images and the index.html page).

Figure 6:
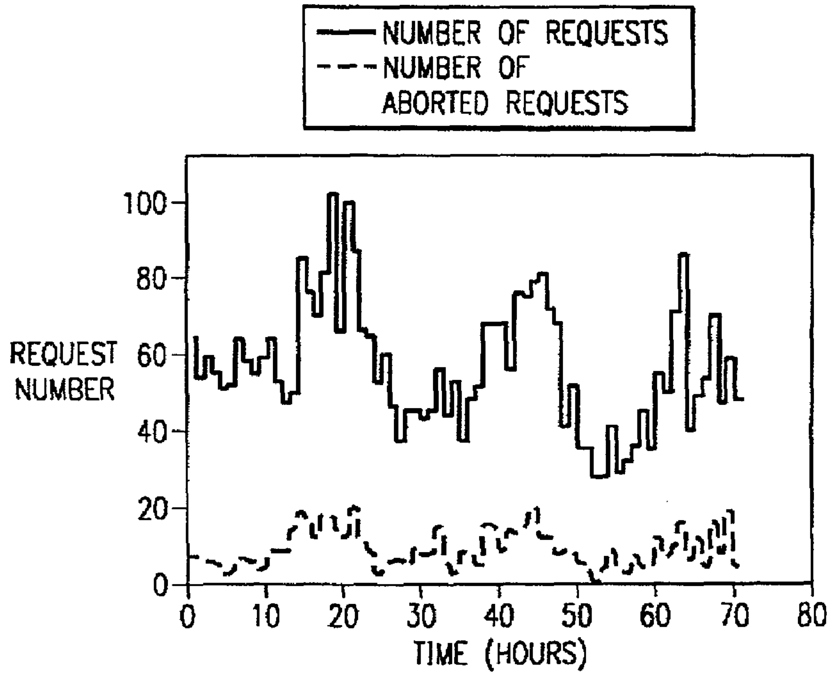
FIG. 6 shows the number of all requests and the number of aborted requests to the "index.html" page over time for a study conducted with a preferred embodiment of the present invention.
Figure 7:
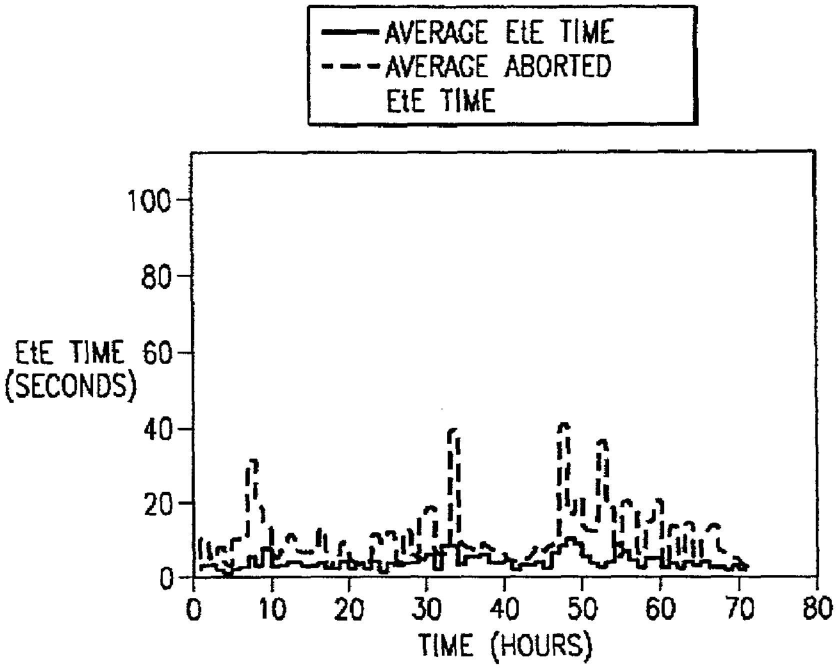
FIG. 7 shows the average end-to-end response time observed by the clients when downloading the "index.html" page and the average end-to-end response time observed by the clients of the aborted accesses to the "index.html" page for a study conducted with a preferred embodiment of the present invention.

In this study, the average end-to-end response time observed by clients when downloading the web page was 3.978 seconds, while the average end-to-end response time observed by the clients of the aborted web pages was 9.21 seconds. FIG. 6 shows the number of all requests and the number of aborted requests to the "index.html" page over time (on an hourly scale) for this study. FIG. 7 shows the average end-to-end response time observed by the clients when downloading the "index.html" page and the average end-to-end response time observed by the clients of the aborted accesses to "index.html" on the hourly scale for this study.

Figure 8:
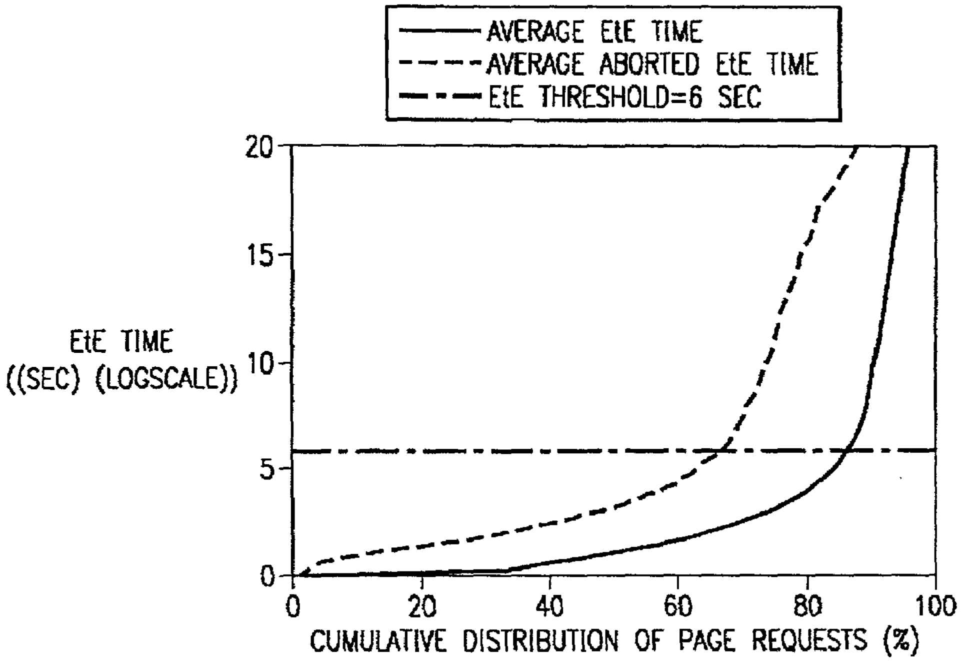
FIG. 8 shows cumulative distribution of all accesses to "index.html" and aborted accesses to "index.html" sorted by their end-to-end response time in increasing order for a study conducted with a preferred embodiment of the present invention.

Then, in our analysis of this study, we sorted all of the accesses of the "index.html" page and all of the aborted accesses to the "index.html" page by their respective end-to-end response time in increasing order, and for each given latency, we computed the cumulative percentage of the web page requests having a response time below the given latency. FIG. 8 shows cumulative distribution of all accesses to "index.html" and aborted accesses to "index.html" sorted by their end-to-end response time in increasing order. The horizontal line on the graph shows the threshold of 6 seconds that corresponds to a generally acceptable end-to-end response time for a web page download. Of course, for larger web pages it may be desirable to use a different threshold value.

It should be recognized that FIG. 8 shows that 68% of the aborted accesses in this study have an end-to-end response time below 6 seconds. Thus, only 32% of all the aborted accesses observe high end-to-end response time. That is, in this study, only 32% of the aborted web page accesses are potentially related to poor server QoS because 68% of the aborted accesses had an acceptable response time (below the threshold of 6 seconds).

We next distinguished the reasons leading to a poor response time (for the 32% of the aborted accesses having a high response time): whether it is due to network latency, server latency, or both. For this purpose, we check the page service time ratio, as defined above. In our study, all of the aborted pages with high response time had PageServiceRatio (P)≧1, i.e. the high response time was due to network related performance problems. Accordingly, while 16.4% of the total client accesses were aborted, it is determined in this study that such aborted connections are not indicative of poor web server QoS. Thus, as this example illustrates, embodiments of the present invention provide a technique for relating aborted client accesses of server information (e.g., a web page) to the server's QoS to more accurately analyze the true client-perceived QoS of a server.

When implemented via computer-executable instructions, various elements of the present invention, such as modules 401-404 of FIG. 4, are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 9:
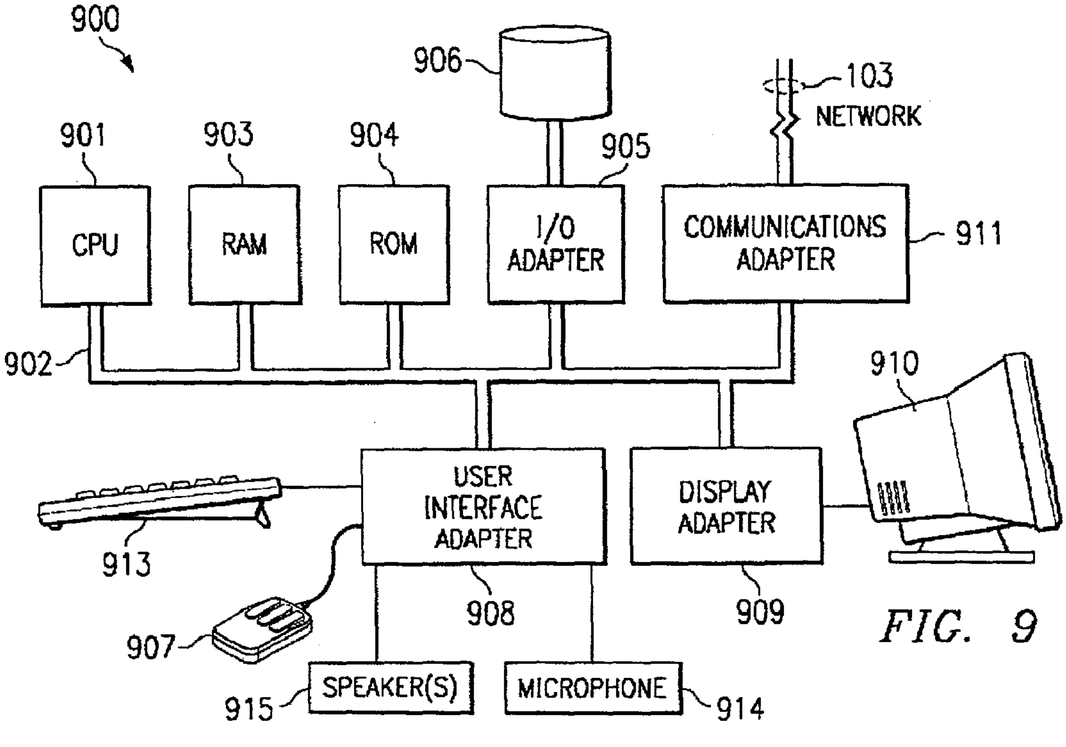
FIG. 9 shows an example computer system on which embodiments of the present invention may be implemented.

FIG. 9 illustrates an example computer system 900 adapted according to embodiments of the present invention. In certain embodiments of the present invention, computer system 900 is a web server on which computer executable code may be implemented for relating aborted client accesses of server information to the server's QoS. Central processing unit (CPU) 901 is coupled to system bus 902. CPU 901 may be any general purpose CPU. Suitable processors include without limitation INTEL's PENTIUM® 4 processor, for example. However, the present invention is not restricted by the architecture of CPU 901 as long as CPU 901 supports the inventive operations as described herein. CPU 901 may execute the various logical instructions according to embodiments of the present invention. For example, CPU 901 may execute machine-level instructions according to the exemplary operational flows described above in conjunction with FIGS. 3 and 5.

Computer system 900 also preferably includes random access memory (RAM) 903, which may be SRAM, DRAM, SDRAM, or the like. Computer system 900 may utilize RAM 903 to store the Network Trace 401A, Transaction Log 402A, and/or Web Page Session Log 403A, as examples. Computer system 900 preferably includes read-only memory (ROM) 904 which may be PROM, EPROM, EEPROM, or the like. RAM 903 and ROM 904 hold user and system data and programs as is well known in the art.

Computer system 900 also preferably includes input/output (I/O) adapter 905, communications adapter 911, user interface adapter 908, and display adapter 909. I/O adapter 905 and/or user interface adapter 908 may, in certain embodiments, enable a user to interact with computer system 900 in order to input information (e.g., for specifying a response time threshold used for determining whether an aborted client access of server information is related to poor server QoS).

I/O adapter 905 preferably connects to storage device(s) 906, such as one or more of hard drive, compact disc (CD) drive, floppy disk drive, tape drive, etc. to computer system 900. The storage devices may be utilized when RAM 903 is insufficient for the memory requirements associated with storing data for reconstructing web page accesses. Communications adapter 911 is preferably adapted to couple computer system 900 to network 103. User interface adapter 908 couples user input devices, such as keyboard 913, pointing device 907, and microphone 914 and/or output devices, such as speaker(s) 915 to computer system 900. Display adapter 909 is driven by CPU 901 to control the display on display device 910.

It shall be appreciated that the present invention is not limited to the architecture of system 900. For example, any suitable processor-based device may be utilized, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

What is claimed is:

1. A method for relating aborted client accesses of server information to a quality of service provided to clients by a server in a client-server network, said method comprising:

identifying said aborted client accesses of server information from said server, wherein said aborted client accesses include accesses aborted by one or more of the clients, and wherein said identifying is based on detecting at least one indication of aborts by the one or more clients;

determining, by one or more processors, performance data for said aborted client accesses of server information from said server; and using, by the one or more processors, said performance data to:

identify a first subset of the aborted client accesses relevant to the quality of service provided to the one or more clients by said server, wherein the first subset includes aborted client accesses associated with performance data violating at least one criterion; and identify a second subset of the aborted client accesses not relevant to the quality of service provided to the one or more clients by said server, wherein the second subset includes aborted client accesses associated with performance data not violating the at least one criterion.

2. The method of claim 1, wherein the at least one criterion comprises a predefined threshold, and violating the at least one criterion comprises exceeding the predefined threshold, and wherein said using further comprises:

determining whether said performance data for a given one of said aborted client accesses exceeds the predefined threshold.

3. The method of claim 2 further comprising:

if said performance data for said given aborted client access is determined to exceed the predefined threshold, then identifying said given aborted client access as being part of the first subset; and if said performance data for said given aborted client access is determined to not exceed the predefined threshold, then identifying said given aborted client access as being part of the second subset.

4. The method of claim 3 wherein said performance data for said given aborted client access comprises a response time in communicating requested information from said server to the one or more clients, and wherein the predefined threshold is a predefined response time threshold.

5. The method of claim 1 wherein said determining performance data comprises:

determining latency attributable to said client-server network.

6. The method of claim 1 wherein said determining performance data comprises:

determining latency attributable to said server.

7. The method of claim 6, wherein the at least one criterion comprises a predefined threshold for latency attributable to said server, and violating the at least one criterion comprises exceeding the predefined threshold, and wherein said using further comprises:

determining whether said latency attributable to said server for a given one of said aborted client accesses exceeds the predefined threshold.

8. The method of claim 7 further comprising:

if said latency attributable to said server for said given aborted client access is determined to exceed the predefined threshold, then identifying said given aborted client access as being part of the first subset; and if said latency attributable to said server for said given aborted client access is determined to not exceed the predefined threshold, then identifying said given aborted client access as being part of the second subset.

9. The method of claim 1, wherein said identifying based on detecting the at least one indication comprises identifying based on the at least one indication in network-level information.

10. The method of claim 9 wherein said at least one indication includes a Transmission Control Protocol RST packet sent by one of the one or more clients to the server that explicitly indicates an aborted client access.

11. The method of claim 9 wherein said at least one indication includes a Transmission Control Protocol FIN packet with ACK sent by one of the one or more clients to the server, wherein an acknowledged sequence number in the FIN packet is less than a maximum sequence number sent from the server to the one of the one or more clients.

12. The method of claim 1 wherein said server comprises a web server.

13. The method of claim 12 wherein said aborted client accesses comprise aborted Transmission Control Protocol connections to said web server for the one or more clients accessing one or more web pages from said web server.

14. The method of claim 1 wherein said server information from said server comprises one or more web pages.

15. The method of claim 14 further comprising:

acquiring information for a plurality of client-server transactions and using said acquired information to relate said client-server transactions to their corresponding client web page accesses.

16. The method of claim 1 further comprising:

capturing network-level information for said aborted client accesses; and using the captured network-level information to reconstruct said client aborted accesses, wherein said identifying and said determining are based on the reconstructed aborted client accesses.

17. The method of claim 1, wherein the second subset of the aborted client accesses not relevant to the quality of service is considered to relate to a client browsing pattern.

18. The method of claim 1, further comprising using the second subset of the aborted client accesses to determine a reason for poor quality of service provided to the one or more clients by said server.

19. The method of claim 1, wherein the performance data comprises server latency times attributable to said server for respective ones of said aborted client accesses, and the performance data further comprises total response times for respective ones of said aborted client accesses, where each of the total response times includes the server latency time attributable to said server and a network latency time attributable to said client-server network for the corresponding aborted client access, and wherein said performance data for a given one of said aborted client accesses violating the at least one criterion comprises the total response time for the given aborted client access exceeding a first threshold, and the server latency time for the given aborted client access exceeding a second threshold, the method further comprising:

in response to determining that the total response time for the given aborted client access exceeds the first threshold and the server latency time for the given aborted client access exceeds the second threshold, identifying the given aborted client access as being part of the first subset; and in response to determining that either the total response time for the given aborted client access does not exceed the first threshold or the server latency time for the given aborted client access does not exceed the second threshold, identify the given aborted client access as being part of the second subset.

20. A system for measuring client-perceived quality of service provided by a server in a client-server network, said system comprising:

one or more processors; and a computer-readable medium storing instructions executable on the one or more processors to:

identify aborted client accesses of server information at said server, wherein said aborted client accesses include accesses aborted by one or more clients, and wherein said identifying is based on detecting at least one indication of aborts by the one or more clients;

determine performance data for said aborted client accesses of said server information; and use said performance data to:

identify a first subset of the aborted client accesses relevant to the quality of service provided to the one or more clients by said server, wherein the first subset includes aborted client accesses associated with performance data violating at least one criterion, and identify a second subset of the aborted client accesses not relevant to the quality of service provided to the one or more clients by said server, wherein the second subset includes aborted client accesses associated with performance data not violating the at least one criterion.

21. The system of claim 20 wherein said one or more processors is part of said server.

22. The system of claim 20, wherein the at least one criterion comprises a predefined threshold, and violating the at least one criterion comprises exceeding the predefined threshold, and wherein said instructions are executable to further determine whether said performance data for a given one of said aborted client accesses exceeds the predefined threshold.

23. The system of claim 22 wherein said instructions are executable to further:

identify said given aborted client access as being part of the first subset if said performance data for said given aborted client access is determined to exceed said predefined threshold; and identify said given aborted client access as being part of the second subset if said performance data for said given aborted client access is determined not to exceed said predefined threshold.

24. The system of claim 23 wherein said performance data for said given aborted client access comprises a response time in communicating said server information from said server to the one or more clients, and wherein the predefined threshold is a predefined response time threshold.

25. The system of claim 20 wherein said server comprises a web server.

26. The system of claim 20, wherein said aborted client accesses comprise aborted Transmission Control Protocol connections to said server.

27. The system of claim 20 wherein said server information comprises a web page.

28. The system of claim 20, wherein said at least one indication comprises a Transmission Control Protocol RST packet.

29. The system of claim 20, wherein said at least one indication comprises a Transmission Control Protocol FIN packet with ACK sent by one of the one or more clients to said server, wherein an acknowledged sequence number in the FIN packet is less than a maximum sequence number sent from said server to the one of the one or more clients.

30. The system of claim 20, wherein the second subset of the aborted client accesses not relevant to the quality of service is considered to relate to a client browsing pattern.

31. The system of claim 20, wherein the instructions are executable to further use the second subset of the aborted client accesses to determine a reason for poor quality of service provided to the one or more clients by said server.

32. The system of claim 20, wherein the performance data comprises server latency times attributable to said server for respective ones of said aborted client accesses, and the performance data further comprises total response times for respective ones of said aborted client accesses, where each of the total response times includes the server latency time attributable to said server and a network latency time attributable to said client-server network for the corresponding aborted client access, and wherein said performance data for a given one of said aborted client accesses violating the at least one criterion comprises the total response time for the given aborted client access exceeding a first threshold, and the server latency time for the given aborted client access exceeding a second threshold, wherein said instructions are executable to further:

in response to determining that the total response time for the given aborted client access exceeds the first threshold and the server latency time for the given aborted client access exceeds the second threshold, identify the given aborted client access as being part of the first subset; and in response to determining that either the total response time for the given aborted client access does not exceed the first threshold or the server latency time for the given aborted client access does not exceed the second threshold, identify the given aborted client access as being part of the second subset.

33. A non-transitory computer-readable medium storing instructions executable on one or more processors to:

identify aborted client accesses of server information at a server in a client-server network, wherein said aborted client accesses include accesses aborted by one or more clients, and wherein said identifying is based on detecting at least one indication of aborts by the one or more clients;

determine performance data for said aborted client accesses of said server information; and use said performance data to:

identify a first subset of the aborted client accesses relevant to a quality of service provided to the one or more clients by said server, wherein the first subset includes aborted client accesses associated with performance data violating at least one criterion, and identify a second subset of the aborted client accesses not relevant to the quality of service provided to the one or more clients by said server, wherein the second subset includes aborted client accesses associated with performance data not violating the at least one criterion.

34. The computer-readable medium of claim 33, wherein the at least one criterion comprises a predefined threshold, and violating the at least one criterion comprises exceeding the predefined threshold, and wherein said instructions are executable to further:

determine whether said performance data for a given one of said aborted client accesses exceeds the predefined threshold.

35. The computer-readable medium of claim 34, wherein said instructions are executable to further:

identify said given aborted client access as being part of the first subset if said performance data for said given aborted client access is determined to exceed said predefined threshold; and identify said given aborted client access as being part of the second subset if said performance data for said given aborted client access is determined not to exceed said predefined threshold.

36. The computer-readable medium of claim 33, wherein said at least one indication comprises a Transmission Control Protocol RST packet.

37. The computer-readable medium of claim 33, wherein said at least one indication comprises a Transmission Control Protocol FIN packet with ACK sent by one of the one or more clients to said server, wherein an acknowledged sequence number in the FIN packet is less than a maximum sequence number sent from said server to the one of the one or more clients.

38. The computer-readable medium of claim 33, wherein the second subset of the aborted client accesses not relevant to the quality of service is considered to relate to a client browsing pattern.

39. The computer-readable medium of claim 33, wherein the instructions are executable to further use the second subset of the aborted client accesses to determine a reason for poor quality of service provided to the one or more clients by said server.

40. The computer-readable of claim 33, wherein the performance data comprises server latency times attributable to said server for respective ones of said aborted client accesses, and the performance data further comprises total response times for respective ones of said aborted client accesses, where each of the total response times includes the server latency time attributable to said server and a network latency time attributable to said client-server network for the corresponding aborted client access, and wherein said performance data for a given one of said aborted client accesses violating the at least one criterion comprises the total response time for the given aborted client access exceeding a first threshold, and the server latency time for the given aborted client access exceeding a second threshold, wherein said instructions are executable to further:

in response to determining that the total response time for the given aborted client access exceeds the first threshold and the server latency time for the given aborted client access exceeds the second threshold, identify the given aborted client access as being part of the first subset; and in response to determining that either the total response time for the given aborted client access does not exceed the first threshold or the server latency time for the given aborted client access does not exceed the second threshold, identify the given aborted client access as being part of the second subset.

* * * * *

UNITED STATES PATENT AND TRADEMARK OFFICE

CERTIFICATE OF CORRECTION

PATENT NO. : 8,392,499 B2
APPLICATION NO. : 10/146988
DATED : March 5, 2013
INVENTOR(S) : Ludmila Cherkasova et al.

It is certified that error appears in the above-identified patent and that said Letters Patent is hereby corrected as shown below:

In the Claims

In column 26, line 33, in Claim 40, delete “of” and insert -- medium of --, therefor.

Signed and Sealed this
Twenty-third Day of July, 2013

Teresa Stanek Rea
*Acting Director of the United States Patent and Trademark Office*